March 10, 1936. A. P. BALL 2,033,873
VENTILATING WINDOW MECHANISM
Filed June 25, 1934   2 Sheets-Sheet 1
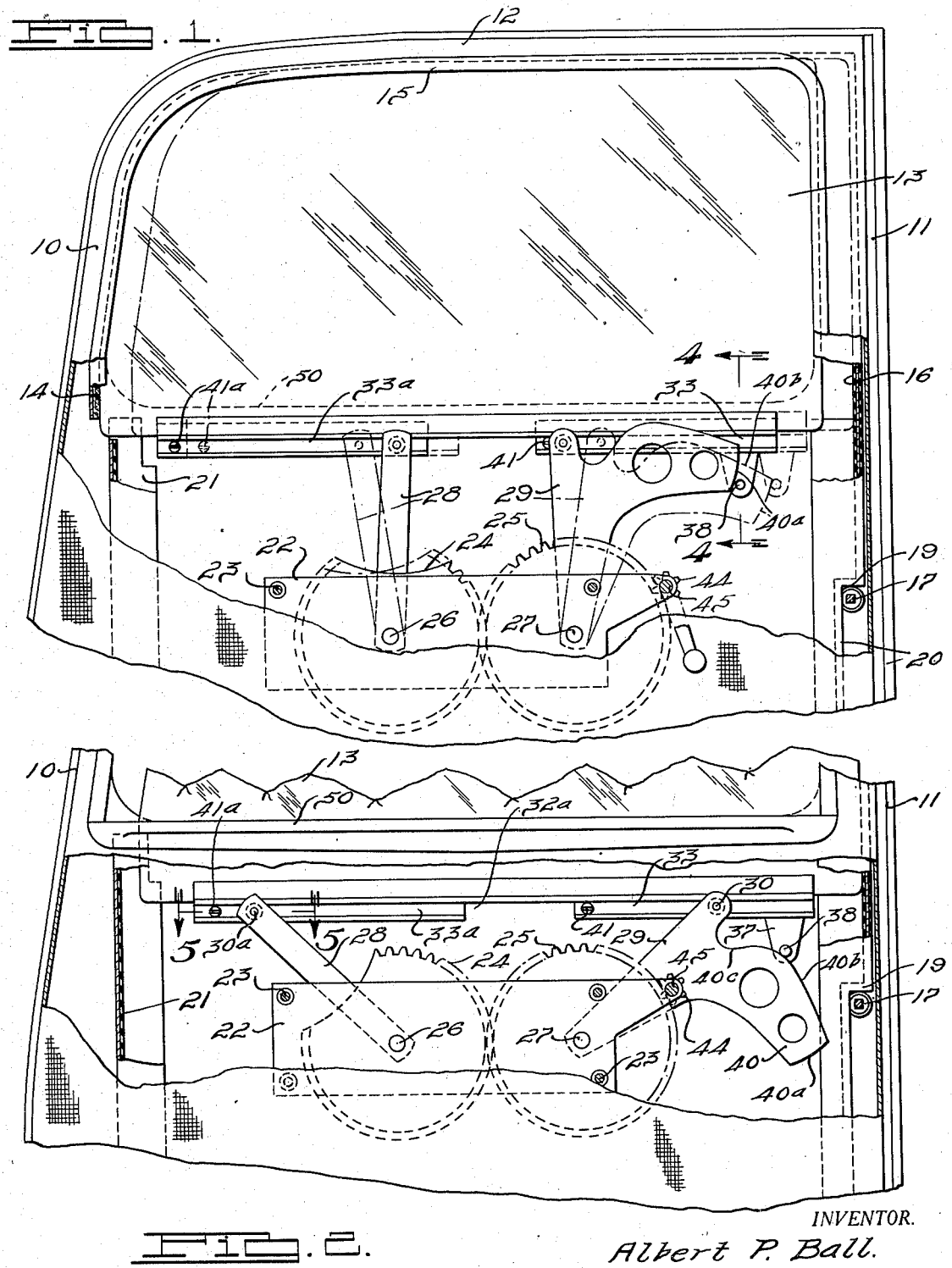
INVENTOR.
Albert P. Ball.
BY Dike, Calver and Gray
ATTORNEYS.

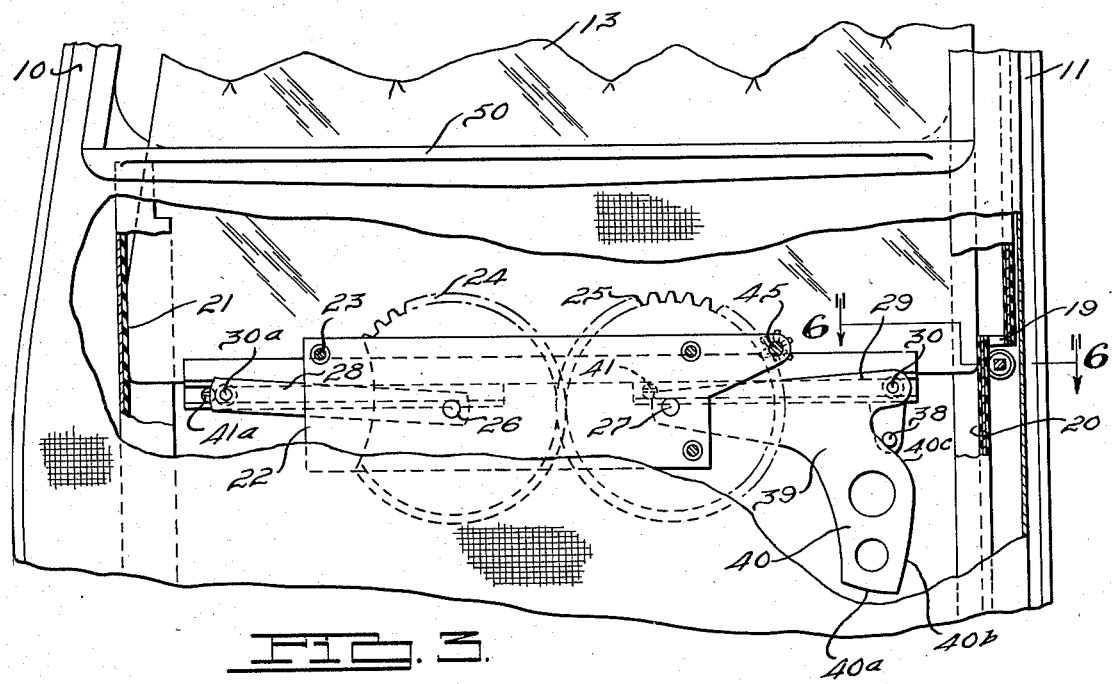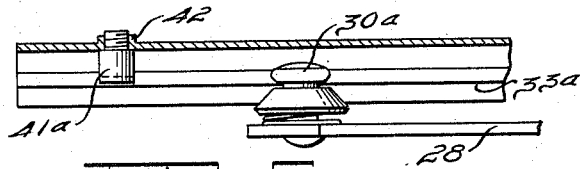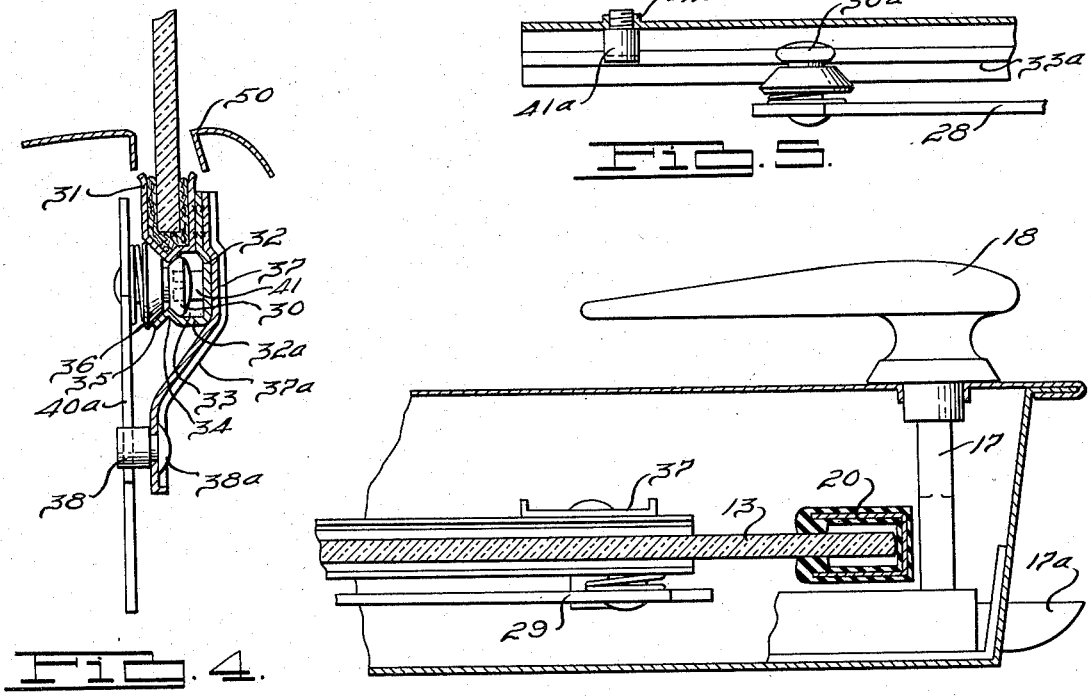

Patented Mar. 10, 1936

2,033,873

UNITED STATES PATENT OFFICE 2,033,873

VENTILATING WINDOW MECHANISM

Albert P. Ball, Detroit, Mich., assignor, by mesne assignments, to Automobile Ventilation, Inc., Detroit, Mich., a corporation of Michigan Application June 25, 1934, Serial No. 732,274

13 Claims. (Cl. 268—126)

This invention relates to ventilating windows for vehicle bodies particularly adapted for use in the doors of automobile bodies. An object of the invention is to provide an improved and relatively simple and economical mechanism for raising and lowering the window glass in the window in the body or door and for providing a ventilating slot at the forward edge of the glass when the glass is fully raised vertically and also for sliding the glass longitudinally in its plane into and out of position to close said ventilating slot.

In accordance with the present preferred embodiment of the invention it is desirable to raise the glass vertically into ventilating position in the window with the ventilating slot provided along the forward edge thereof and thence to shift the glass laterally and forwardly into position for fully closing the window opening. Such a construction is advantageous in that it provides a positive closing of the window by the glass when the window regulator has been operated to the limit of its travel in one direction, thus preventing the danger either of leaving the window partly open at its top or along its forward edge as a consequence of over-running the regulator mechanism, an operation heretofore noted in connection with the use of mechanism for ventilating windows in which the glass is first elevated into fully closed position and thereafter upon further operation of the operating mechanism is shifted rearwardly into ventilating position.

The present structure is particularly desirable for use in connection with a window in which the glass, when in closed position, is first shifted longitudinally in its plane into ventilating position before moving vertically downward. The present structure is particularly adapted for use where such a window glass is mounted in a vehicle door which is hinged at its forward edge. Heretofore considerable difficulty has been experienced in providing a construction in which the rear edge of the glass moving vertically while maintained in the ventilating position could pass the lock mechanism in the rear pillar of the door during such travel, except where an undesirably wide door pillar was provided at the rear of the door, or when an expensive and complicated operating mechanism was provided.

By virtue of the present invention the foregoing disadvantages of prior structures are overcome and a window is provided in which the glass is shifted by positive means which are effective to move the glass longitudinally during its vertical travel so as to pass or clear any latch obstruction. This construction permits the use of a deep channel or glass runway at the upper rear edge of the window opening in the door without, however, necessitating any increase in the width or thickness of the door latch through the rear pillar of the door.

Other objects of this invention will appear in the following description and appended claims, reference being had to the accompanying drawings forming a part of this specification wherein like reference characters designate corresponding parts in the several views.

Fig. 1 is a fragmentary side elevation illustrating a front door of an automobile body embodying the present invention, the window glass being shown in full lines in its fully closed position and in dotted lines in its ventilating position.

Fig. 2 is a fragmentary side elevation illustrating a predetermined position of the operating mechanism.

Fig. 3 is a fragmentary side elevation illustrating a further position of the operating mechanism.

Fig. 4 is a section taken through lines 4—4 of Fig. 1 in the direction of the arrows.

Fig. 5 is a section taken through lines 5—5 of Fig. 2 in the direction of the arrows.

Fig. 6 is a section taken through lines 6—6 of Fig. 3 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claims herein beyond the requirements of the prior art.

In the drawings there is illustrated, by way of example, a front door of an automobile having a window glass mounted therein and adapted to be elevated by regulator mechanism into position within the window opening of the door to provide a ventilating slot between the forward edge of the glass and the adjacent door pillar. The regulator mechanism is thus operative to move the window glass into its top vertical position while maintaining it at the same time in ventilating position, and this mechanism is also operative to shift the glass forwardly in its plane to close the ventilating slot and thus fully close the window opening. In the illustrated construction the door is hinged at its forward edge and is, therefore, provided with latch mechanism mounted in the rear pillar of the door. In order to permit the window glass to be moved vertically and upwardly into ventilating position and at the same time to prevent interference with the latch mechanism, the present invention provides means for shifting the window glass horizontally in its plane at an intermediate point between its upper and lower positions so as to clear or avoid the latch mechanism and thus enable the rear edge of the window to overlie the latch mechanism when the glass is in its top ventilating position.

As illustrated in the drawings, the door comprises a front pillar 10 and a rear pillar 11 connected at their upper ends by the usual header 12. The front and rear pillars together with the header define a window opening which is adapted to be closed by means of a glass panel 13. Mounted in the front pillar 10 is a felted glass channel 14 adapted to receive the forward edge of the glass when fully closed, as shown in full lines in Fig. 1. The channel 14 extends upwardly and rearwardly at 15 within the header 12 so as to confine the upper edge of the glass when closed. The rear pillar 11 is constructed so as to provide a relatively deep glass channel or runway 16 to receive the rear edge of the glass when the latter is in ventilating position, as shown in dotted lines in Fig. 1. The glass channel 16 is of sufficient depth to confine the rear edge of the glass when it is shifted forwardly to close the ventilating slot.

It will be understood that in the present instance the front pillar 10 of the door is hinged to the front body pillar so that the door is latched, when closed, at its rear edge. A latch or locking mechanism for the door may comprise a transverse rotatable shaft 17 extending through the pillar 11 as shown in Fig. 6, this shaft being turned by means of a handle 18 to retract the latch bolt 17a. It will be seen that the shaft 17 of the latch mechanism underlies the glass channel 16 and as a result it is not possible to shift the glass in a straight vertical line into and out of ventilating position. In the present construction the deep glass runway or channel 16 terminates at 19 above the shaft 17 in a forwardly offset shoulder and thence the runway or channel extends downwardly within the door pillar forwardly of the shaft 17, providing a relatively shallow extension 20. The front pillar 10 is provided with an auxiliary glass runway or channel 21 below the window sill 50 and effective in cooperation with the shallow channel 20 to guide the window glass during the lower part of its travel.

The window regulator mechanism for raising and lowering the glass 13 may be of any suitable construction and in the present instance comprises a mounting plate 22 secured by screws 23 to the inside of the door well. The plate 22 carries a pair of meshing gears 24 and 25 which are journaled on the plate by means of pivots 26 and 27 respectively. Secured to the pivot 26 is a swinging arm 28 and secured to the pivot 27 is a swinging arm 29, these arms being swung in opposite directions upon rotation of the gears. Secured to the outer end of each of the arms 28 and 29 are stud or button-like devices 30 and 30a having a shank riveted to the end of the respective arms. Along the lower edge of the glass there is fastened a felt lined channel 31. A plate or plates are spot welded to one face of the channel 31, see Fig. 4, and have depending walls forwardly flanged at 32 along their lower edges to provide with the lower edge of the channel 31 a runway or runways 33 and 33a for the studs 30 and 30a. Each runway, as shown at 34 in Fig. 4, has a constricted neck forming upper and lower tapered faces engaging the tapered sides of the stud 30 or 30a, and the members 31 and 32 which together form the glass retainer member, have outwardly flared bearing surfaces, indicated at 35, engaged by conical spring pressed washer 36 carried by the studs 30 and 30a. From this construction it will be seen that when the arms 28 and 29 are swung relatively to each other, the studs 30 and 30a will slide horizontally in the runways or camways 33 and 33a and thus raise and lower the window glass.

Secured as by welding to one side of the glass retainer member is a depending extension or hanger 37 which is offset at 37a, and to the lower offset end of this hanger is riveted at 38a a headed pin 38. In the present instance the arm 29 is provided with a lateral extension or auxiliary arm 39 provided with a cam 40. This cam is cut so as to provide successive cam edges 40a, 40b and 40c adapted to cooperate with the pin 38 during the vertical and horizontal travel of the window glass, as hereinafter more fully described. Within the guideway 33 and 33a of the glass retainer member 31—32 is located projecting studs or pins 41 and 41a, these pins each having a threaded end adapted to be screwed into a tapped boss 42 (Fig. 5) in the back wall of the guideway and thereby being detachable. The pin or screw 41 or 41a extends into the path of the studs 30 or 30a on the arms 28 and 29, these parts cooperating as hereinafter described to shift the window horizontally in its plane.

In operation it will be seen that when the window is in its fully closed position, as shown in full lines in Fig. 1, the regulator arms 28 and 29 will occupy their respective positions also shown in full lines in this figure. At this time the pin 38 will be in engagement with the cam edge 40a of the cam 40 and the stop pin 41 will be in engagement with the stud 30 on the arm 29, thus blocking the window against rearward movement as a result of any forces which may be applied directly to the window. As the regulator arms are swung outwardly and away from each other, starting from the fully closed position of the window shown in Fig. 1, cam 40a traveling against the pin 38 will shift the window glass horizontally and rearwardly in its plane into the deep glass runway 16, the position of the parts at this time being shown in dotted lines in Fig. 1, and the pin 38 being disposed at the end of this movement substantially at the juncture of the cam edges 40a and 40b. Continued swinging movement of the regulator arms in the same direction will thereupon lower the window glass 13 while the rear edge thereof is maintained in the deep runway 16 and while still in ventilating position. The pin 38 will travel over the cam edge 40b and in engagement therewith, thus holding the rear edge of the window glass against the bottom of the glass runway 16, preventing forward displacement thereof, and also effecting a third point of support for the glass in addition to the supporting points 30 and 30a. As the lower edge of the glass approaches the offset 19 in the deep runway 16 it will be noted that the stud 30a on the swinging arm 28, traveling laterally, will approach the stop pin 41a, as seen in Fig. 2, and at the proper time before the lower edge of the glass reaches the shoulder 19 the stud 30a will bear against the pin 41a and, due to the arc of its travel, will shift the window glass forwardly in its plane so that its rear vertical edge will be in line with the channel 20 and in advance of the shaft 17 of the latch, as seen in Fig. 3. Thence the window glass will be carried downwardly by the swinging arms and guided within the glass runways 20 and 21.

During the time that the stud 30a coacts with the pin 41a to shift the glass forwardly from the deep channel 16 to a position in line with the channel 20, the pin 38 will travel along and bear against the cam edge 40c of the cam 40, this cam being cut so as to conform exactly to the compound movement of the pin 38 as the glass is shifted downwardly and forwardly.

By turning the gears 24 and 25 in the opposite direction, after the glass has reached its lowest position, and thus swinging the arms 28 and 29 upwardly, the reverse action will take place. During this upward travel of the glass, and at a predetermined time, the pin 38 will be engaged by the cam edge 40c and this cam will function to shift the glass rearwardly in its plane from the position shown in Fig. 3 (after clearing the shoulder 19) to the position shown in Fig. 2. Thence as the rear edge of the glass travels upwardly within the deep channel 16 the pin 38 will travel along the cam edge 40b and in engagement therewith, thus providing, as above stated, a third point of support for the window and a positive means for maintaining the rear edge of the glass against the bottom of the deep channel 16. After the glass has reached its fully elevated position, as shown in dotted lines in Fig. 1, and is at the same time in ventilating position with a ventilating slot formed between its forward edge and the runway 14, continued swinging movement of the arms 28 and 29 toward each other will cause the stud 30 to engage the stop 41 and shift the glass forwardly in its plane to close the ventilating slot, as shown in full lines in Fig. 1.

In assembling the regulator mechanism with the window glass it will be understood that the screw or pin 41 will be detached from the channel 33 and the studs 30 and 30a will be shifted vertically through a cut-away or open portion 32a and then laterally into the channels 33a and 33, after which the stop pin 41 may be screwed into position.

I claim:

1. Regulator mechanism for a window glass mounted in a vehicle body window opening for successive vertical and horizontal movements in its plane, comprising swinging arms connected to the lower edge of the glass for raising and lowering the same, a cam carried by one arm and cooperating with a part on the glass for sliding the glass horizontally in its plane in one direction during the vertical travel thereof, and means independent of said cam and cooperating with a part on the glass for shifting the same horizontally in its plane in an opposite direction during the vertical travel thereof.

2. Regulator mechanism for a window glass mounted in a vehicle body window opening for successive vertical and horizontal movements in its plane, comprising swinging arms connected to the lower edge of the glass for raising and lowering the same, a cam carried by one of said arms and cooperating with a part on the glass for sliding the glass horizontally in its plane in one direction during the vertical travel thereof, and separate means synchronized therewith and operable during the downward vertical travel of the glass for shifting the same horizontally in its plane in the opposite direction.

3. Regulator mechanism for a window glass mounted in a vehicle door window opening for successive vertical and horizontal movements in its plane, comprising swinging arms connected to the lower edge of the glass for raising and lowering the same, a projecting stud fixed to the said edge of the glass and a cam on one of said arms cooperating with the stud for shifting the glass horizontally in its plane when elevated and while moving upwardly in its vertical plane, and separate means cooperating with said regulator mechanism for shifting the glass horizontally in its plane in the opposite direction during its downward vertical movement.

4. Regulator mechanism for a window glass mounted in a vehicle door window opening for successive vertical and horizontal movements in its plane, comprising a pair of swinging arms connected to the lower edge of the glass for raising and lowering the same, a projecting stud fixed to the said edge of the glass and a cam on one arm cooperating with the stud for shifting the glass horizontally in its plane in one direction when elevated, and a second stud secured to the edge of the glass with which the other swinging arm cooperates for shifting the glass in an opposite direction horizontally in its plane during the lowering thereof.

5. Regulator mechanism for a window glass mounted in a vehicle door window opening for successive vertical and horizontal movements in its plane, comprising a pair of swinging arms connected to the lower edge of the glass for raising and lowering the same, a projecting stud fixed to the said edge of the glass and a cam on one of said arms cooperating with the stud for shifting the glass horizontally in its plane in one direction when elevated, and a second stud secured to the edge of the glass, the other of said arms cooperating with said second stud at a point intermediate the raised and lowered positions of the glass during the vertical travel of the glass for shifting the latter in an opposite horizontal direction in its plane.

6. Regulator mechanism for a window glass mounted in a vehicle door window opening for vertical movement into and out of position to provide a ventilating slot at the forward edge of the glass and thence horizontally in the plane of the glass to close said slot, comprising a channel connected to the glass, a pair of swinging arms connected with said channel for raising and lowering the glass, a cam secured to one arm, a depending pin on said channel cooperating with said cam for sliding the glass horizontally in its plane when in elevated position, and a pin in said channel and cooperating with the other of said arms for longitudinally displacing the position of the glass at a point intermediate its raised and lowered positions.

7. Regulator mechanism for a window glass mounted in a vehicle door window opening for vertical movement into and out of position to provide a ventilating slot at the forward edge of the glass and thence horizontally in the plane of the glass to close said slot, comprising a channel connected to the glass, a pair of swinging arms connected with said channel for raising and lowering the glass, a cam secured to one arm, a depending pin on said channel cooperating with said cam for sliding the glass horizontally in its plane when in elevated position or while being moved to the raised position, and a pin in said channel cooperating with the other of said arms for longitudinally displacing the position of the glass at a point intermediate its raised and lowered positions.

8. Regulator mechanism for a window mounted in a window frame of a vehicle body or the like, comprising a retainer member secured to the lower edge of the window, a pair of swinging arms connected to said member for raising and lowering the window in said frame, and a projecting device mounted on said member and adapted to be engaged by one of said arms at a point intermediate the upper and lower limits of vertical travel of the window for moving the window longitudinally in its plane.

9. Regulator mechanism for a window glass mounted in a window frame of a vehicle body or the like, comprising a guide rail secured to the lower edge of the glass, a pair of swinging arms connected to said rail for raising and lowering the glass, a projection on said rail, and a device at the outer end of one of the arms and engageable with said projection for displacing the glass longitudinally during its vertical travel in one direction.

10. Regulator mechanism for a window glass mounted in a window frame of a vehicle body or the like, comprising a guide rail secured to the lower edge of the glass, a pair of swinging arms connected to said rail for raising and lowering the glass, a projection on said rail, a device at the outer end of one of the arms and engageable with said projection for displacing the glass longitudinally during its vertical travel in one direction, and a cam on the other arm engageable with a part on the rail for displacing the glass longitudinally in the opposite direction during its vertical travel in the other direction.

11. Regulator mechanism for a window glass mounted in a window frame of a vehicle body or the like, comprising a pair of swinging arms adapted to be connected to the lower edge of the glass for raising and lowering the same, cooperating means carried by one of said arms and the glass for moving the glass edgewise in its plane into or out of position to provide a ventilating slot or opening at the forward upright edge of the glass, and means independent of said means and controlled by one of said arms for displacing the glass in a longitudinal direction during the vertical travel of the glass intermediate its upper and lower limits of movement.

12. Regulator mechanism for a window glass mounted in a window frame of a vehicle body or the like, comprising a guide rail secured to the lower edge of the glass, a pair of swinging arms adapted to be connected to said guide rail for raising and lowering the glass, cooperating means carried by one of said arms and said guide rail for moving the glass edgewise in its plane into or out of position to provide a ventilating slot or opening at one upright edge of the glass, and cooperating means independent of said first named means carried by said rail and the other of said arms for displacing the glass in a direction longitudinally of the vehicle during the vertical travel of the glass intermediate its upper and lower limits of movement.

13. Regulator mechanism for a window glass mounted in a window frame of a vehicle body or the like, comprising a guide rail secured to the lower edge of the glass, a pair of swinging arms adapted to be connected to said rail for raising and lowering the glass, projections located at spaced points on said rail, and means carried by said arms cooperable with said projections, one for moving the glass edgewise in its plane into or out of position to provide a ventilating slot or opening at the forward upright edge of the glass, and the other for displacing the glass in a longitudinal direction during the vertical travel of the glass intermediate its upper and lower limits of movement.

ALBERT P. BALL.